May 25, 1954 R. W. SMITH ET AL 2,679,568
CERAMIC CONTACT RESISTOR COMPOSITION
Filed Nov. 7, 1950
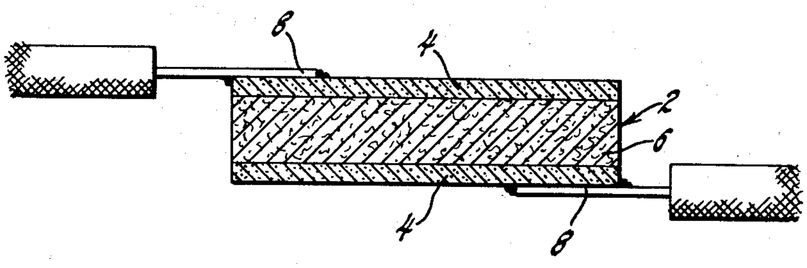
Inventors
Robert W. Smith &
Karl Schwartzwalder
By
Willits, Helwig & Baillio
Attorneys Patented May 25, 1954

2,679,568

UNITED STATES PATENT OFFICE 2,679,568

CERAMIC CONTACT RESISTOR COMPOSITION

Robert W. Smith, Flint, and Karl Schwartzwalder, Holly, Mich., assignors to General Motors Corporation, Detroit, Mich., a corporation of Delaware Application November 7, 1950, Serial No. 194,500

7 Claims. (Cl. 201—63)

The present invention relates to electrical resistors and particularly to a ceramic especially adapted to unite non-metallic resistance materials with metallic electrical conductors by conventional methods for providing an integral bond between such conductors and resistors.

Heretofore, resistors of the non-metallic type, particularly those including such resistance materials as graphite, carbon and inorganic oxides have lacked satisfactory electrical terminal means for providing suitable electrical connections in an electrical circuit. With such resistors it has been the common practice to spray, evaporate or electroplate thin metallic films on the terminal surfaces of the resistor units to provide terminal contact surfaces. Contact terminal surfaces of such film have not been entirely satisfactory in that the bond between the resistor unit and the films obtained in this manner is a mechanical bond which has been found to fail in corrosive atmospheres and under conditions involving cyclic thermal stress.

Accordingly, it is an object of the present invention to provide a ceramic terminal for electrical resistors which is especially adapted to integral bonding with non-metallic resistor compositions and with metallic conductors by conventional bonding methods such as welding, brazing, soldering and the like.

This and other objects are attained in accordance with the present invention by providing a ceramic terminal composition including components which when treated in a predetermined manner will adhere to electrical resistors of the aforementioned type to form a monolithic ceramic structure with electrical terminal surfaces suitable for integral bonding with metallic electrical conductors.

For a better understanding of the invention reference may be had to the drawing consisting of one view which is a cross-sectional view of a resistor unit embodying the present invention.

Referring now to the drawing there is illustrated an electrical resistor unit assembly 2 including terminal contact surface portions 4, a resistor portion 6 and metallic conductors 8 bonded to the terminal contact portions 4 by such conventional bonding methods as welding, soldering, brazing and the like.

In accordance with the present invention we have found that a glass bonded composition of metallic powders provides a terminal surface for electric resistors which forms a monolithic structure with the resistor and is capable of forming an integral bond with metallic conductors by conventional bonding methods.

More specifically, we have found that a terminal contact surface material which has optimum electrical and bonding characteristics with electrical resistor units comprises about 70 to 89% nickel, about 8 to 29% boro-silicate glass and about 1 to 3% alkaline earth borate glass, for example, a magnesium-borate glass. In connection with the contact surface material of this invention we have found that while nickel powder of about 325 mesh is preferable as the electrical conducting constituent, other metallic powders such as silver, copper, Nichrome and iron may be used with satisfactory results. The boro-silicate glass which we prefer may be that known as "Pyrex" and the magnesium borate glass may consist of about 95% $B_2O_3$ and about 5% MgO, both of which glasses are preferably ground to about 200 mesh. Of course it will be understood that the aforementioned glasses may vary considerably in composition and that the invention is not limited to use of these particular compositions.

In the forming of monolithic structures with resistor units it is desirable to adjust the composition of the contact terminal surface materials to provide for sintering temperatures which are suitable to both the contact surface materials and the material of the resistor units. In this connection we have found that a composition suitable for sintering at temperatures of from 1150° to 1300° F. consists of about 70% nickel, about 28% boro-silicate glass, and about 2% magnesium-borate glass. For sintering temperatures of 1300 to 1550° F. a composition consisting of about 78% nickel, about 21% boro-silicate glass and about 1% magnesium-borate glass is desirable. Likewise, for sintering temperatures of 1550 to 1700° F. a composition of about 80% nickel, about 19% boro-silicate glass and about 1% magnesium-borate glass is preferable.

Likewise, we have found that the contact terminal surface materials of our invention are particularly useful in forming monolithic unitary structures with both positive and negative temperature coefficient of resistance units which are of the glass bonded type. Such resistors include the negative temperature coefficient of resistance resistor units comprising a glass bonded resistor of magnetite with a glass phase such as illustrated and described in the United States Patent 2,480,166 of Schwartzwalder et al. dated August 30, 1949, and the low positive or negative temperature coefficient of resistance resistor units comprising glass bonded resistors of graphite or carbon with a glass phase such as a resistor composition consisting of about 7% carbon, about 7% magnesium borate glass, about 57% boro-silicate glass and about 29% aluminum-oxide as a filler.

Of course it will be understood that the contact terminal surface material of our invention will find useful application with any resistor unit structure in which the electrical conductive constituents are integrally bonded with a glass phase.

In providing resistor units with the contact terminals of the present invention, a small quantity of the contact terminal material is placed in the bottom of a molding die which is formed to provide a resistor of the shape desired. The material for the resistor portion of the unit is then introduced and thereafter a small quantity of the contact terminal material is introduced and the mass is compressed under pressure. The layered compacted mass of materials is then removed from the molding die and sintered at a temperature suitable to provide a glassy bond in continuity through the layers from one surface of the unit to its opposed surface. In this manner there is formed a dense monolithic ceramic structure with a resistor portion intermediate contact terminal portions. With contact terminal portions such as those disclosed herein the unitary structure is adapted to be joined to metallic conductors by such conventional means as welding, brazing and soldering with bonds that will withstand corrosive atmospheres as well as cyclic thermal stress.

What we claim and desire to obtain by Letters Patent of the United States is:

1. A monolithic ceramic resistor unit comprising a resistor portion of a glass-bonded resistance material and a terminal portion of powdered material bonded by a glass phase including a borosilicate glass and alkaline earth borate glass, said powdered material being selected from the group consisting of nickel, copper, silver, Nichrome and iron.

2. A monolithic ceramic resistor unit comprising a resistor portion of a glass-bonded resistance material selected from the group consisting of magnetite and carbon and a terminal portion of powder bonded by a glass phase including a borosilicate glass and an alkaline earth borate glass, said powder being selected from the group consisting of nickel, copper, silver, Nichrome and iron.

3. A monolithic ceramic resistor unit comprising a resistor portion of a glass-bonded resistance material and a terminal portion containing from about 70–89% of a powdered material selected from the group consisting of nickel, copper, silver, Nichrome and iron, from about 8–29% borosilicate glass, and from about 1–3% alkaline earth borate glass.

4. A monolithic ceramic resistor unit comprising a resistor portion of magnetite bonded by a borate glass and a terminal portion containing from about 70–89% nickel powder, from about 8–29% borosilicate glass, and from about 1–3% magnesium borate glass.

5. A monolithic ceramic resistor unit comprising a resistor portion of carbon bonded by a borate glass and a terminal portion containing from about 70–89% nickel powder, from about 8–29% borosilicate glass, and from about 1–3% magnesium borate glass.

6. A monolithic ceramic resistor unit comprising a resistor portion of glass bonded magnetite and a terminal portion of a powder bonded by a glass phase including a borosilicate glass and an alkaline earth borate glass, said powder being selected from the group consisting of nickel, copper, silver, Nichrome and iron.

7. A monolithic ceramic resistor unit comprising a resistor portion of a glass bonded resistance material and a terminal portion containing from about 70 to 89% metal powder, from about 8 to 29% borosilicate glass and from about 1 to 3% alkaline earth borate glass.

References Cited in the file of this patent

UNITED STATES PATENTS

| Number | Name | Date |
|---|---|---|
| 1,922,221 | Steenbeck et al. | Aug. 15, 1933 |
| 2,106,249 | Hower | Jan. 25, 1938 |
| 2,106,578 | Schwartzwalder | Jan. 25, 1938 |
| 2,248,415 | Schwartzwalder | July 8, 1941 |
| 2,267,571 | McDougal | Dec. 23, 1941 |

FOREIGN PATENTS

| Number | Country | Date |
|---|---|---|
| 314,173 | Germany | Sept. 1, 1919 |